Feb. 12, 1924. 1,483,305
M. R. HULL
WEATHER STRIP FOR MOTOR VEHICLE WINDSHIELDS
Filed April 1, 1921
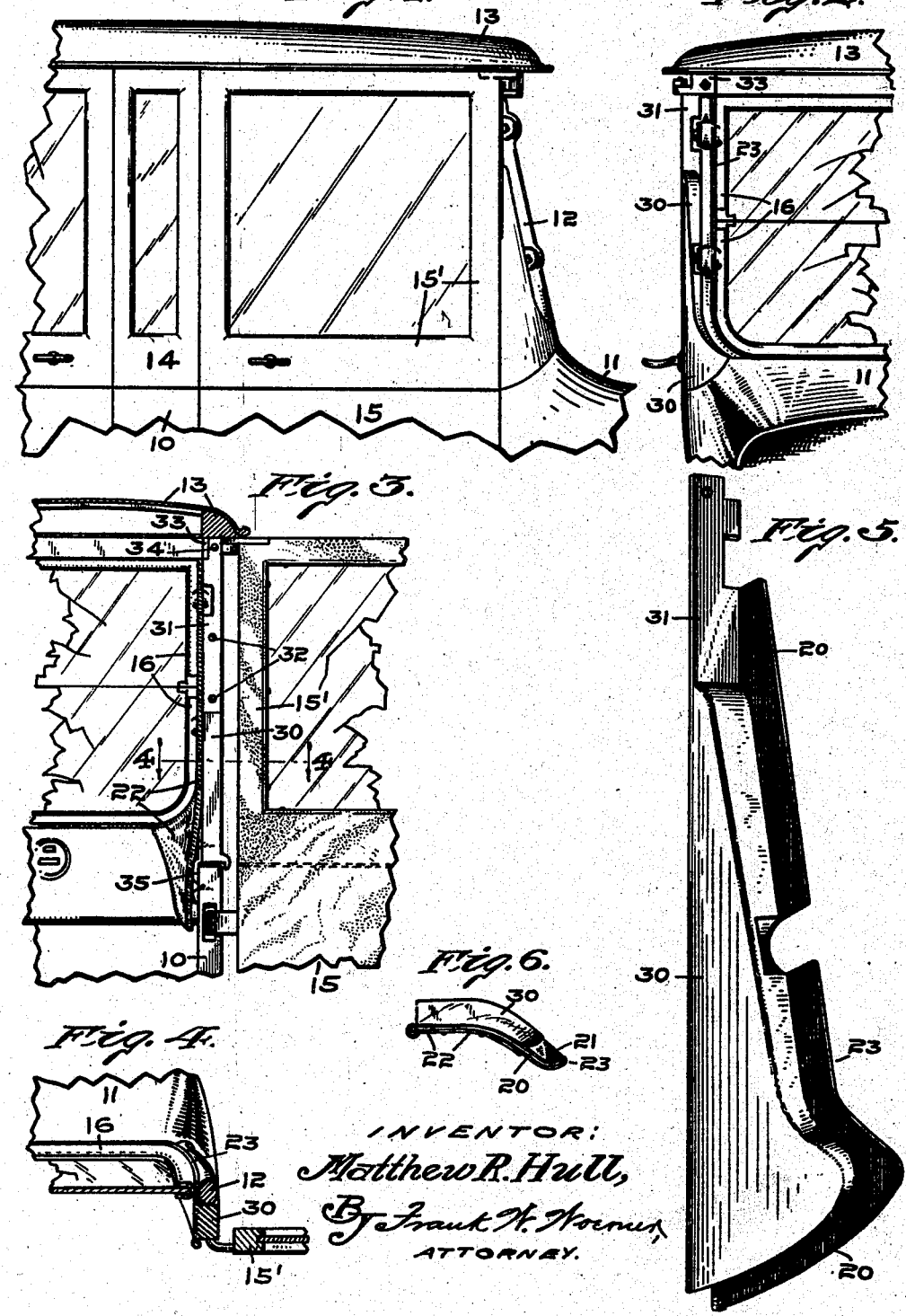
INVENTOR:
Matthew R. Hull,
By Frank H. Woiner,
ATTORNEY.

Patented Feb. 12, 1924.

1,483,305

UNITED STATES PATENT OFFICE.

MATTHEW R. HULL, OF CONNERSVILLE, INDIANA, ASSIGNOR TO REX MANUFACTURING COMPANY, OF CONNERSVILLE, INDIANA, A CORPORATION.

WEATHER STRIP FOR MOTOR-VEHICLE WINDSHIELDS.

Application filed April 1, 1921. Serial No. 457,775.

*To all whom it may concern:*

Be it known that I, MATTHEW R. HULL, a citizen of the United States, residing at Connersville, in the county of Fayette and State of Indiana, have invented certain new and useful Improvements in Weather Strips for Motor-Vehicle Windshields, of which the following is a specification.

The invention relates to a combined weatherstrip and corner panel for excluding the passage of wind, dust, rain, and snow between the side edges of a windshield and its supporting stanchions in that type of open touring cars having "all-season" tops for converting them into closed body vehicles.

When the ordinary windshield is mounted in operative position considerable space remains between the adjacent edges of the windshield and stanchions through which wind, dust, rain and snow are admitted to the interior of the vehicle body, causing possible damage to the upholstery, and such annoyances as may arise from an impairment of the ignition system when the terminals located on the instrument board on the inside of the body become wet.

One of the objects of the present invention consists in the provision of a combined weatherstrip and corner panel which not only excludes the passage of wind, dust, rain and snow by completely filling the open space between the edges of the windshield and stanchions, but which is sufficiently rigid to maintain its initial alinement and thus prevent its interference with the free operation of the swinging sections of the windshield.

A further object of the invention consists in the provision of a combined weatherstrip and corner panel which, in addition to effectually closing the space between the edges of the windshield and stanchions for excluding wind, dust, rain and snow, will be practically unnoticeable and thus avoid any tendency of detracting from the general appearance of the vehicle.

I accomplish the above objects of the invention, and such others as may appear from a perusal of the following description and claims, by means of the construction illustrated in the accompanying drawings, forming a part hereof, in which—

Figure 1 is a fragmentary detail view in side elevation of the front portion of a conventional style of touring body having an "all-season" top fitted thereon, showing my invention in operative position. Fig. 2 is a front elevation of the construction shown in Fig. 1. Fig. 3 is a transverse vertical sectional view through one side of the vehicle body and top, looking towards the front of the vehicle. Fig. 4 is a horizontal cross section, on the line 4—4 in Fig. 3. Fig. 5 is a perspective view of one of my improved weatherstrips and corner panels. Fig. 6 is an underside plan view of the lower end of the construction shown in Fig. 5.

Referring to the drawings, it may conveniently be stated that I have shown only one side of the vehicle body in the drawings, but I desire to have it understood that the opposite side of the vehicle is similarly constructed, and that the description is to be interpreted as referring to both sides of the vehicle.

In the drawings, 10 designates a conventional type of open touring automobile body, and 11 the cowl. 12 represents the usual stanchions arranged at the forward end of the body which are adapted to secure the forward end of the usual cape top, these stanchions being employed in the present instance to support the forward end of the deck 13 of an "all-season" top, which exemplifies that type of construction having removable side panels 14 and upper door sections 15′. When the removable side panel 14 and door section 15′ of an "all-season" top are inserted in operative position between the deck 13 and body 10 a considerable opening remains between the adjacent edge of the upper door section 15′ of the front door 15 and the stanchion 12, and it is the joint purpose of my invention not only to exclude the wind, dust, rain and snow from gaining access to the interior of the closed body through the space intervening the side edges of the movable sections of the windshield 16 and stanchions 12, but also to provide a neat appearing corner panel for closing the opening remaining between the straight vertical side edge of the upper door section 15′ and the adjacent side edge of the inclined stanchion 12. In the application of my combined weatherstrip and corner panel I preferably provide a substantially rigid sheet metal strip 20 which serves to add rigidity and prevent buckling of the leather or other suitable material 21, which is usually employed for covering the exposed portion of the metal sheet, and also the upholstery 22 employed for covering that portion of the raw surface of the sheet metal strip 20 which is exposed within the interior of body 10. The exposed projected edge 23 of sheet metal strip 20 when covered with leather or other material 21 attains the desired thickness to completely close the space between the side edges of the movable sections of the windshield 16 and stanchion 12 and thus prevents the passage of wind, dust, rain and snow therebetween.

For holding the sheet metal strip in place I provide a corner panel 30 of wood or the like finished to have the same appearance as the automobile body. This panel fits snugly at one side against the vertical edge of the door 15' and at the other side against the inclined edge of the windshield brace or stanchion 12, thus forming an accurate closure for the opening and also giving a neat and finished appearance to this corner of the vehicle body.

A metal strap 31 is secured to the panel 30 by screws 32 and to a metal block 33 by means of a screw or bolt 34. The block 33 is secured to the underside of the deck 13 and receives the upper ends of stanchions 12, thus holding the forward end of the deck in spaced relation to the permanent body 10.

At its lower end the panel 30 has secured to it a bracket 35 (Fig. 3) which bears against the inner surface of the body 10 and helps to hold the panel in place. Upholstery 22 (Figs. 3 and 6) is preferably applied to my combination weatherstrip and corner panel so as to cover the inner surface of sheet metal strip 20 and bracket 35, such upholstery matching or harmonizing with that used on the interior of the vehicle body.

A notch 24 in the metallic strip 20 provides space for the joint 25 of the windshield frame 16. When in place the edge 23 will be flush with the front surface of said frame and the front edge of the windshield post 12, so that its presence will not be noticeable except on close inspection. The remainder of the device corresponds in appearance to adjoining parts and thus the entire device performs its functions without detracting from the appearance of the car.

In practice it has been found that the present device is extremely efficient in excluding the wind, dust, rain and snow from gaining access to the interior of the closed vehicle body; that it is simple in construction, easy to install, and does not detract from the general appearance of the body of the vehicle. The combined weatherstrip and corner panel is so simple that further description thereof is deemed unnecessary.

Having thus fully described my said invention, what I claim as new and desire to secure by Letters Patent, is—

1. In a vehicle body, an inclined windshield and inclined posts supporting the same, a weatherstrip fitting between a post and the adjacent side of the windshield, a demountable corner panel supporting the weatherstrip, and means for holding the panel in place, substantially as set forth.

2. In a vehicle body having demountable side panels and upper door sections, an inclined windshield and inclined posts supporting it, a demountable corner panel for closing the space between the demountable section of a front door and the adjacent windshield post, and a weatherstrip carried by the panel adapted to engage between the side of the windshield and the adjacent post, substantially as set forth.

3. In a vehicle body having demountable side panels and upper door sections, a windshield and posts supporting it, a demountable corner panel similar in appearance to the outside of the vehicle body for closing the space between the demountable section of a front door and the adjacent windshield post, a sheet metal strip carried by the panel forming a weatherstrip to extend between the side of the windshield and the adjacent post, a bracket fixed to the lower end of the panel and hooking over the edge of the vehicle body, a strip secured to the rear edge of the panel and to the vehicle body and upholstery similar to that of the vehicle body covering the inner surface of the panel and the parts carried thereby.

4. In a vehicle body having side panels and upper door sections, an inclined windshield and inclined posts supporting it, a demountable corner panel similar in appearance to the outside of the vehicle body for closing the space between the demountable section of the front door and the windshield post, and means for holding the panel in place comprising a sheet metal strip carried by the panel forming a weatherstrip to extend between the side of the windshield and the adjacent post, a bracket fixed to the lower end of the panel and hooking over the edge of the vehicle body, and a strip secured to the rear edge of the panel and to the vehicle body, substantially as set forth.

5. The combination with an enclosed motor vehicle body including the windshield and supporting stanchions, of a weatherstrip adapted to seal the space intervening the windshield and stanchions, a corner panel for sustaining said weatherstrip in operative position, and means for securely anchoring the upper and lower ends of said weatherstrip and corner panel, substantially as set forth.

6. The combination with an enclosed motor vehicle body including the windshield and supporting stanchions, of a rigid weatherstrip adapted to close the space intervening the adjacent edges of the windshield and stanchions, means for supporting the weatherstrip in operative position, and a cover for changing the exposed surface of the weatherstrip to correspond to the surfaces of the adjacent parts of the vehicle, substantially as set forth.

In witness whereof, I have hereunto set my hand and seal at Connersville, Indiana, this 29th day of March, A. D. one thousand nine hundred and twenty-one.

MATTHEW R. HULL. [L. S.]